United States Patent [19]

Mowdood

[11] 3,821,159

[45] June 28, 1974

[54] FIRE RETARDANT POLYMER CONTAINING OCTACHLOROCYCLOPENTENE

[75] Inventor: Syed K. Mowdood, Akron, Ohio

[73] Assignee: The Goodyear Tire & Rubber Company, Akron, Ohio

[22] Filed: Dec. 2, 1971

[21] Appl. No.: 204,359

[52] U.S. Cl... 260/45.7 R, 260/87.5 R, 260/92.8 W
[51] Int. Cl................................................ C09k 3/28
[58] Field of Search ................. 260/45.7 R, 92.8 W

[56] References Cited
UNITED STATES PATENTS

| | | |
|---|---|---|
| 2,741,639 | 4/1956 | Kleiman............................ 260/648 |
| 2,786,062 | 3/1957 | Vollmann ........................ 260/314.5 |
| 2,900,420 | 8/1959 | Lidoy................................... 260/648 |
| 3,004,935 | 10/1961 | Raley, Jr. et al...................... 260/2.5 |
| 3,372,141 | 3/1968 | Dickerson et al................ 260/45.95 |
| 3,392,136 | 7/1968 | Hindersinn et al. ................ 260/31.8 |
| 3,422,047 | 1/1969 | Cannelongo....................... 260/28.5 |
| 3,523,986 | 8/1970 | Bingham............................ 260/92.8 |

Primary Examiner—Donald E. Czaja
Assistant Examiner—R. A. White
Attorney, Agent, or Firm—F. W. Brunner; J. P. Ward; V. G. Parker

[57] ABSTRACT

The transparency, gloss and resistance to burning of polymers is improved when the polymer contains octachlorocyclopentene (OCCP).

3 Claims, No Drawings

FIRE RETARDANT POLYMER CONTAINING OCTACHLOROCYCLOPENTENE

This invention relates to improving the transparency, gloss and resistance to burning of polymers, particularly vinyl polymers, through the use of octachlorocyclopentene (OCCP) added either to the polymer or present in the polymerization reaction during the formation of the polymer.

The following examples are illustrative of the present invention, all amounts are in parts by weight per 100 parts of monomer.

EXAMPLE 1

The following formulation was used in making the improved polymer of this invention wherein G is general and P is preferred.

| | Ingredients | Amount Used | Range |
|---|---|---|---|
| 1. | Vinylchloride (polymerizable monomer) | 100 | 100 |
| 2. | Suspending agent Methocel 60 Hg-50 (methyl cellulose) | .16 | .1–3.0 |
| 3. | Initiator t-butyl peroxypivalate (75% in mineral spirits) | .15 | .01–5.0 |
| 4. | Reaction medium — water (distilled) | 200 | 100–300 |
| 5. | Modifier — octochlorocyclopentene (OCCP) | 1.0 | .1–2.5 G / .58–2.0 P |
| | Conditions | | |
| 6. | Temperature °C. | 60°C. | 49–71°C. |
| 7. | Pressure psi | 138 psi | 90–180 psi |
| 8. | Agitation — one propeller stirring downward at rpm plus baffles | 470 rpm | 200–500 rpm |

A conventional glass-lined pressure vessel equipped with external heating and cooling means is first evacuated and then charged with the water containing the dispersing agent, to which water is then charged the initiator, modifier and the polymerizable monomer. The contents are then reacted at 60°C. to maximum conversion. The modifier may be added at pressure drop to obtain good reaction rate.

EXAMPLE 2

In this example the OCCP modifier was added to the control resin and, after thorough blending, processed into a thin sheet on a calender equipped with mirror smooth calender rolls and then tested for transparency, resistance to burning and appearance. The control resin was made by the formulation of Example 1 without the addition of the OCCP. The polyvinyl chloride produced in Examples 1 and 2 had the properties reported in the following table.

In the table an improvement in gloss, haze, light transmission and resistance to burning was observed for both Examples 1 and 2 when compared to the control. A flame retardancy of 4 represents a condition where the resin supports a flame as long as the ignition source is being applied to the resin. Values of 1 and 2 represent proportionately better flame retardancy for Examples 2 and 1 respectively.

The improvement of this invention is applicable to those monomeric materials which contain a single methylene group attached to a carbon atom by a double bond; that is, compounds which contain a single $$CH_2=C<$$

group, and particularly a single $CH_2=CH-$ group. The most important class of such materials consists of monomers containing a single olefinic double bond present in a $$CH_2=C<$$

group, in which the second carbon atom is attached by at least one of the free valences to an electronegative group, that is, a group which increases substantially the polar characteristics of the molecule. Among such monomers are the vinyl aromatics, such as styrene, p-chlorostyrene; esters of alphamethylene aliphatic monocarboxylic acids, such as methyl acrylate, ethyl acrylate, n-butyl acrylate, isobutyl acrylate, dodecyl acrylate, 2-chloroethyl acrylate, 2-chloropropyl acrylate, 2,2'-dichlorisopropyl acrylate, phenyl acrylate, cyclohexyl acrylate, methyl alpha-chloroacrylate, methyl methacrylate, ethyl methacrylate, methyl ethacrylate; acrylonitrile; methacrylonitrile; acrylamide; vinyl esters, such as vinyl acetate, vinyl chloroacetate, vinyl

TABLE

| | Property | Control | Ex. 1 PVC + OCCP (added during polymerization) | Ex. 2 PVC + OCCP (added to PVC) |
|---|---|---|---|---|
| 1. | Gloss | Fair | Better than Control | Better than Control |
| 2. | Percent Haze | Fair | Better than Control | Better than Control |
| 3. | Percent Light Transmission | Fair | Better than Control | Better than Control |
| 4. | Resistance to Burning | Self Extinguishing | Non-burning | Non-burning |
| 5. | Rating (flame retardancy | 4 | 2 | 1 | propionate, vinyl butyrate; vinyl halides, such as vinyl chloride or vinyl bromide; vinyl ethers, such as vinyl methyl ether, vinyl isobutyl ether, vinyl 2-chlorethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds, such as N-vinyl pyrrole, N-vinyl carbazole, N-vinyl indole, N-vinyl succinimide; and other similar polymerizable materials. The method of this invention is also applicable to the copolymerization of mixtures of two or more of these monomeric materials.

Any suitable dispersing agent may be used in this invention, such as sodium stearate, sodium oleate, ammonium oleate, potassium palmitate, sodium myristate, rosin or dehydrogenated rosin soaps, gelatin, soluble starch, gum tragacanth, gum acacia, water soluble glycol cellulose, sodium alginate, agar agar, glue, Turkey red oil, the sodium salts of alkyl substituted naphthalene sulfonic acids, the sodium salts of reaction products of fatty acids of high molecular weight, and hydroxy substituted or amino substituted alkyl sulfonic acids. These dispersing agents may be used in concentrations ranging from 0.1 to 3 percent of the monomer present and the most economical amounts are those employing sufficient dispersing agent to bring about the most desirable dispersion of the monomer in the water phase. The OCCP can also be used in mass polymerization to yield polymers of good fire resistance and clarity.

Any suitable polymerization initiator may be used in this invention including those containing a peroxy linkage as the acyl peroxides, e.g., dibenzoyl peroxide, benzoylacetyl peroxide, diacetyl peroxide, benzoyl peroxide, dilauryl peroxide, di-tertiary butyl peroxide, acetyl benzoyl peroxide, tertiary butyl hydroperoxide, cumene hydroperoxide, lauroyl peroxide, hydrogen peroxide, preformed and in-situ formed peroxydicarbonates of the general formula

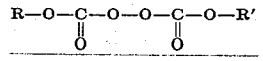

where R and R' are organic radicals including methyl, ethyl, isopropyl, normal propyl, isobutyl, n-butyl, lauryl, amyl, hexyl, nonyl, etc. as well as salts of nonmetallic peracids as ammonium persulfate, potassium persulfate and sodium persulfate. Initiator activators such as sodium bisulfite and buffers such as sodium phosphate may also be used.

While certain representative embodiments and details have been shown for the purpose of illustrating the invention, it will be apparent to those skilled in this art that various changes and modifications may be made therein without departing from the spirit or scope of the invention.

What is claimed is:

1. A polymer, resulting from the polymerization of a monomer containing a methylene group attached to a carbon atom by a double bond, containing octachlorocyclopentene in an amount ranging from 0.1 to 2.5 parts by weight per 100 parts by weight of said polymer.

2. The polymer of claim 1 wherein the polymer is polyvinyl chloride.

3. The polymer of claim 2 wherein the octachlorocyclopentene is present in an amount of 1 part per 100 parts of polymer.

* * * * *